(12) United States Patent
Vipat et al.

(10) Patent No.: US 10,956,571 B2
(45) Date of Patent: Mar. 23, 2021

(54) KERNEL RUNTIME INTEGRITY USING PROCESSOR ASSISTS

(71) Applicants: Harshawardhan Vipat, San Jose, CA (US); Manohar R. Castelino, Santa Clara, CA (US); Dongsheng Zhang, San Ramon, CA (US); Kuo-Lang Tseng, Cupertino, CA (US)

(72) Inventors: Harshawardhan Vipat, San Jose, CA (US); Manohar R. Castelino, Santa Clara, CA (US); Dongsheng Zhang, San Ramon, CA (US); Kuo-Lang Tseng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 904 days.

(21) Appl. No.: 14/998,060

(22) Filed: Dec. 24, 2015

(65) Prior Publication Data

US 2016/0335436 A1 Nov. 17, 2016

Related U.S. Application Data

(60) Provisional application No. 62/162,335, filed on May 15, 2015.

(51) Int. Cl.
| | |
|---|---|
| *G06F 21/56* | (2013.01) |
| *G06F 9/455* | (2018.01) |
| *G06F 21/53* | (2013.01) |
| *G06F 21/57* | (2013.01) |

(52) U.S. Cl.
CPC ........ *G06F 21/566* (2013.01); *G06F 9/45558* (2013.01); *G06F 21/53* (2013.01); *G06F 21/56* (2013.01); *G06F 21/57* (2013.01); *G06F 2009/45587* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 6,658,571 | B1 * | 12/2003 | O'Brien | G06F 21/53 709/225 |
| 9,300,671 | B1 * | 3/2016 | Barak | H04L 63/10 |
| 2006/0130060 | A1 * | 6/2006 | Anderson | G06F 9/45533 718/1 |
| 2006/0136720 | A1 * | 6/2006 | Armstrong | G06F 21/53 713/164 |

(Continued)

OTHER PUBLICATIONS

Arvind Seshadri et al., SecVisor: A Tiny Hypervisor to Provide Lifetime Kernel Code Integrity for Commodity OSes, SOSP '07, Oct. 14, 2007, 17 pages, ACM, Stevenson WA, USA.

*Primary Examiner* — Jason Chiang
(74) *Attorney, Agent, or Firm* — Jordan IP Law, LLC

(57) ABSTRACT

Systems, apparatuses and methods may provide for locating operating system (OS) kernel information and user mode code in physical memory, wherein the kernel information includes kernel code and kernel read only data, and specifying permissions for the kernel information and the user code in an extended page table (EPT). Additionally, systems, apparatuses and methods may provide for switching, in accordance with the permissions, between view instances of the EPT in response to one or more hardware virtualization exceptions.

25 Claims, 8 Drawing Sheets

(56) References Cited

U.S. PATENT DOCUMENTS

| | | | |
|---|---|---|---|
| 2010/0037243 A1* | 2/2010 | Mo | G06F 9/45537 719/328 |
| 2011/0307885 A1* | 12/2011 | Cushion | G06F 21/105 718/1 |
| 2012/0079479 A1* | 3/2012 | Hakewill | G06F 9/45558 718/1 |
| 2012/0255012 A1* | 10/2012 | Sallam | G06F 21/52 726/24 |
| 2012/0317568 A1* | 12/2012 | Aasheim | G06F 9/45558 718/1 |
| 2013/0132695 A1* | 5/2013 | Heo | G06F 12/1491 711/163 |
| 2013/0132702 A1* | 5/2013 | Patel | G06F 12/08 711/202 |
| 2013/0312099 A1* | 11/2013 | Edwards | G06F 21/554 726/24 |
| 2015/0269031 A1* | 9/2015 | Wang | G06F 9/45558 718/1 |
| 2016/0239321 A1* | 8/2016 | Dong | G06F 17/30 |

* cited by examiner

KERNEL RUNTIME INTEGRITY USING PROCESSOR ASSISTS

CROSS-REFERENCE TO RELATED APPLICATION

This application claims benefit to U.S. Provisional Patent Application No. 62/162,335 filed May 15, 2015.

TECHNICAL FIELD

Embodiments generally relate to data security. More particularly, embodiments relate to kernel runtime integrity using processor assists.

BACKGROUND

An operating system (OS) may rely on a kernel to maintain the integrity of a computer platform. The kernel may provide services to applications running on the platform, control access to resources, and maintain isolation/separation among applications, and between applications and the kernel. Although the kernel may run at a higher privilege, vulnerabilities introduced by large/ever-increasing code base and the modularization features that most modern operating systems support may make it feasible for attackers to run malicious code at the kernel privilege level and compromise the integrity of the kernel and the compute platform.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

This disclosure may provide non-extensibility and immutability to kernel code and mappings. The disclosure takes advantage of new CPU (central processing unit, e.g., host processor) assists to optimize the performance overhead, does not require modifications to the kernel, and can be utilized to protect the runtime integrity of the kernel (protects the protector) to increase trustworthiness, security, and resilience of Intel platforms. The disclosure may utilize INTEL Virtual Machine Extensions (VMX) to support a special privilege mode called VMX-root, which may be utilized to execute a privileged software component known as a hypervisor (e.g., a security monitor or an extension monitor engine/xMon). The hypervisor (e.g., xMon) may execute as a host to have full control of a CPU and other hardware resources. The operating system (OS), including its rings/privilege structure, may thereby run as a guest in VMX non-root mode. In non-root mode, certain instructions and CPU events may trigger hardware assisted transitions to VMX root mode (VMExits), thereby allowing the hypervisor (e.g., xMon) to monitor and control access to key CPU and platform resources.

Figure 1:
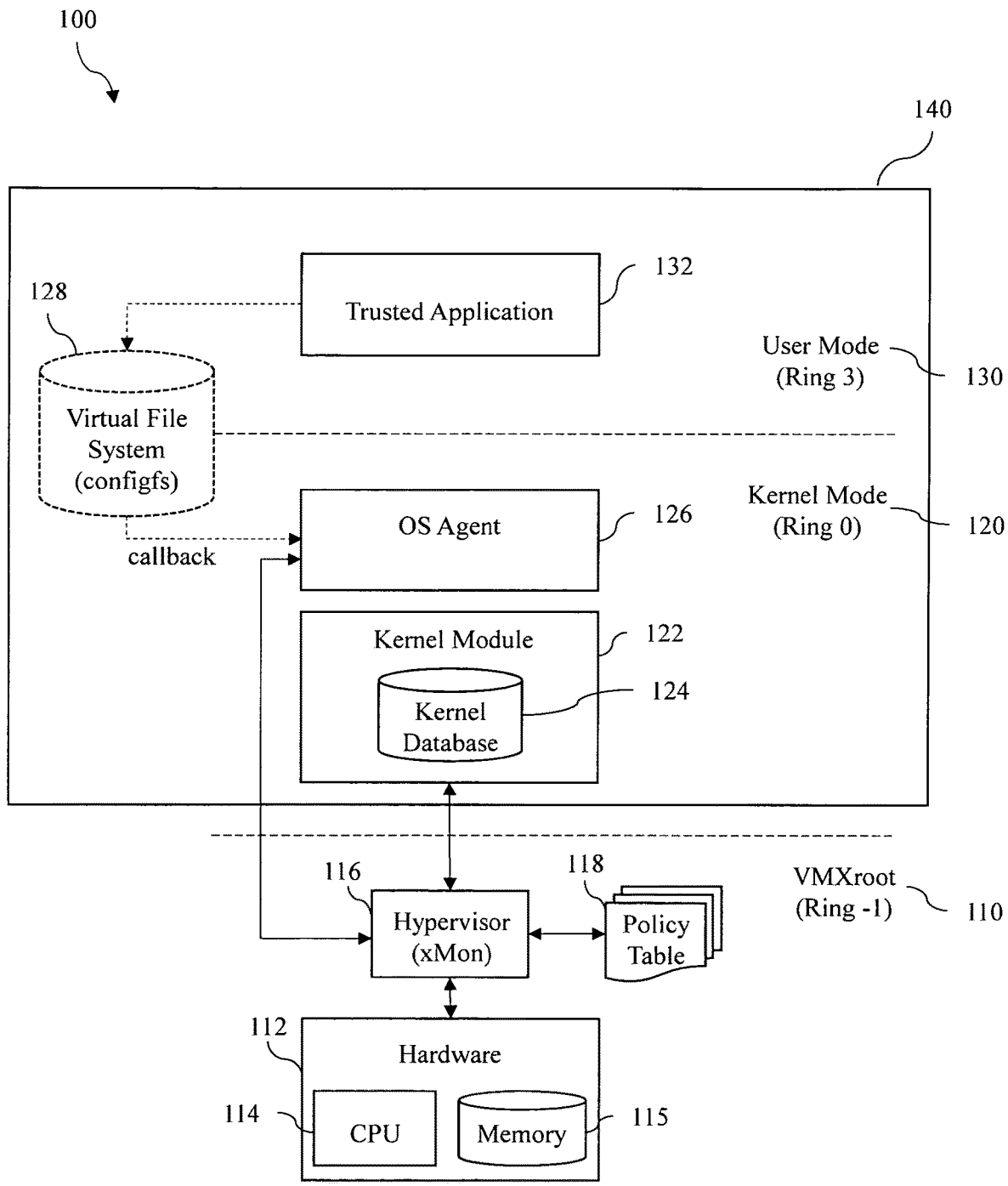
FIG. 1 is a block diagram of an example of a computing architecture according to an embodiment.

Turning now to FIG. 1, a computing data security system 100 that modifies a boot process to start a hypervisor before the operating system (OS) is shown. The system 100 may utilize a virtual machine extension root (VMXroot) process (e.g., INTEL VT-x) for security purposes to implement kernel integrity enforcement without requiring modification to the OS. The system 100 may act to de-privilege an OS such as, for example, an OS 140, such that the OS 140 may operate at a lower than typical privilege (i.e., Ring −1, ring negative 1). The system 100 may generally include a VMX-root (Ring −1) level 110, a kernel mode (Ring 0) level 120, and a user mode (Ring 3) level 130. The VMXroot level 110 may operate at a Ring −1 (negative 1) privilege level and may include one or more hardware component(s) 112 and an xMon 116 (e.g., a hypervisor). The hardware component 112 may include a CPU 114 (e.g., an INTEL CPU operating in VT-x mode), and a memory 115 (e.g., main memory and random access memory). The xMon 116 may be in communication with the hardware component 112, a kernel module 122 and an OS agent 126. The xMon 116 may receive instructions from a policy table 118 via, for example, INTEL VT-x, to observe activities in the OS 140, and determine whether the activities are valid based on a current system policy including permissions. In at least some instances, the xMon 116 may bypass the kernel module 122 and communicate directly with the OS agent 126. The OS 140 may operate in kernel mode level 120 and user mode level 130.

The kernel mode level 120 may operate at a Ring 0 (zero) privilege level and may include a kernel module 122 having a kernel memory 124. The kernel mode level 120 may also include an OS agent 126 (e.g., an INTEL OS agent), in communication with the kernel module 122 and the xMon 116. The OS agent 126 may receive a policy (and policy updates) from a virtual file system 128 (e.g., a configfs database), via, for example, a callback process. The user mode level 130 may operate at a Ring 3 (three) privilege level and may include one or more trusted application(s) 132. The trusted application 132 may be, for example, a rootworm or other administratively privileged application that acts to provision or change a system policy including from, for example, a file, a remote server, and the like, to push the policy down to the xMon 116 via the virtual file system 128.

The CPU 114, upon booting, may load the OS 140 into the memory 116. Once loaded, the OS 140 may run one or more applications. The system 100 may allow the entire OS 140 including a kernel in, for example, a kernel database 124, to be de-privileged using INTEL Virtualization Technology (VTx) assists. The xMon 116 may thereby execute in VMXroot mode at the VMXroot level 110 and at a privilege-level higher than the OS kernel executing at the kernel mode level 120, to set access permissions on critical platform registers and kernel memory pages using VTx controls (VMCS/EPT). Memory page permissions may be setup and managed by the xMon 116 in a manner that only allows approved code to have execute permissions in kernel-mode 120 (Ring 0). Kernel code, kernel read-only data, and kernel page table mappings may be set to be non-writable. On violation of access permissions, the hardware component 112 may transition control of the OS 140 to the xMon 116 (including an xMon-protected agent on the OS) allowing the xMon 116 to instigate further preventive actions. Trampoline codes may also be set up in the OS agent 126 to handle virtualization exceptions. The illustrated system 100 therefore provides non-extensibility and immutability of kernel code, page table mappings and read-only data. Accordingly, integrity of critical platform registers and kernel may be protected using hardware-assisted, outside-OS enforcements.

Figure 2A:
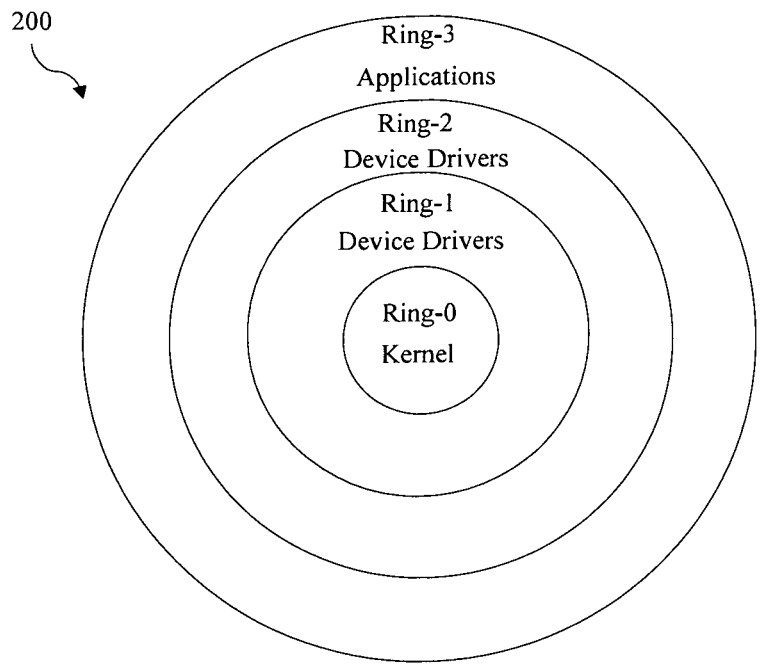
FIGS. 2A-2C are diagrams of examples of security privilege levels according to embodiments.
Figure 2B:
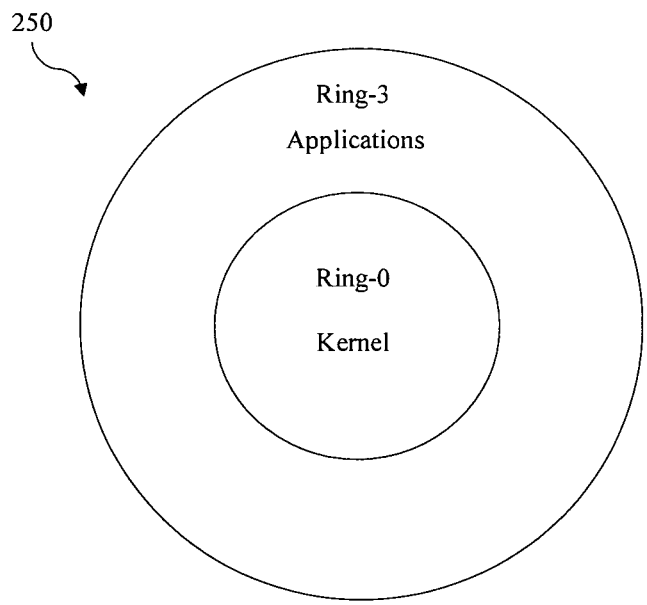
Figure 2C:
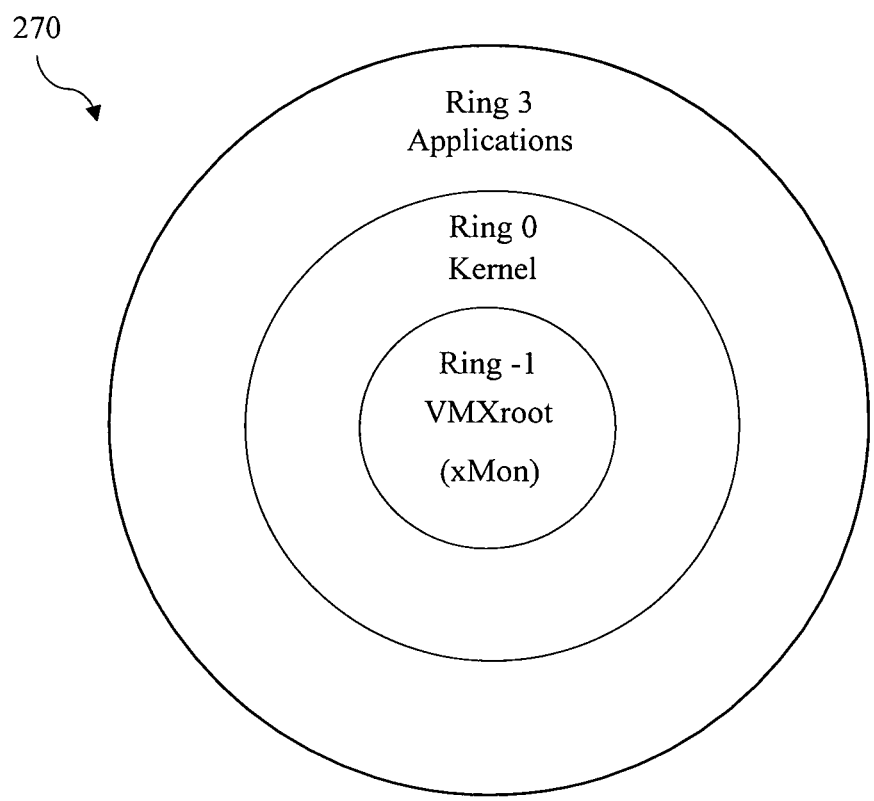

Turning now to FIGS. 2A-C, examples of security privilege levels for use with the system 100 depicting in FIG. 1, are shown. Privilege levels in the INTEL x86 instruction set architecture (ISA) control the degree of access a program currently running on a system processor has to system resources (e.g., memory regions, input/output (I/O) ports), and the ability to execute certain special machine instructions. The privilege levels may therefore provide a mechanism in which the OS and CPU act to restrict what user mode programs can do.

More particularly, FIG. 2A depicts an example of privilege levels 200 for use in Intel x86 microprocessors. There are typically four privilege levels ranging from level 0 to level 3, and typically three main resources being protected: memory, I/O ports and the ability to execute certain machine instructions. The privilege levels (0-3) are often referred to as rings or protection rings (0-3) and reflect an inverse relationship with respect to privilege (restriction). In other words, Ring-0 may be the most privileged and Ring-3 may be the least privileged. Most modern operating systems use Ring 0 for kernel/executive and Ring 3 for application programs, and Ring 1 and Ring 2 may typically be used for device drivers. Because Ring 0 defines the highest privilege level, any resource available to level n may also be available to level 0-n. However, when a lower privileged process (e.g., Ring 3) attempts to access a higher privileged process (e.g., Ring 0), a general protection fault may be reported to the OS.

FIG. 2B depicts another example of privilege levels 250 for use in processors such as, for example, INTEL x86 microprocessors. Because most modern operating systems use only two privilege levels, Ring 0 and Ring 3 (as depicted in FIG. 1), FIG. 2B depicts an example of privilege levels including only Ring 0 and Ring 3. Ring 0 may be used for kernel operations and Ring 3 may be used for application programs. As a result, all user code may typically run in Ring 3 and all kernel code may typically run in Ring 0.

Consistent with the disclosure herein, FIG. 2C depicts an example of privilege levels 270 including Ring 0 and Ring 3, and an additional privilege level Ring −1 (negative 1) that functions at a lower privilege level (i.e., higher security) than Ring 0 and Ring 3. Ring −1 may be used to operate a hypervisor such as, for example, the xMon 116 (FIG. 1) and may act to provide hardware (CPU) assists including virtualization-exception (#VE), fast-view-switch (VMFUNC), and control register target controls to transition to VMX root mode (VMExits), allowing the xMon to monitor and control access to key CPU (e.g., CPU 114, FIG. 1) and platform resources such as, for example, the memory 115 (FIG. 1). The system 100 may therefore significantly reduce system complexity and performance overhead. Further, because the illustrated system 100 derives information and operates only based on the state that the OS stores in CPU data structures it may therefore be OS-agnostic.

Figure 3:
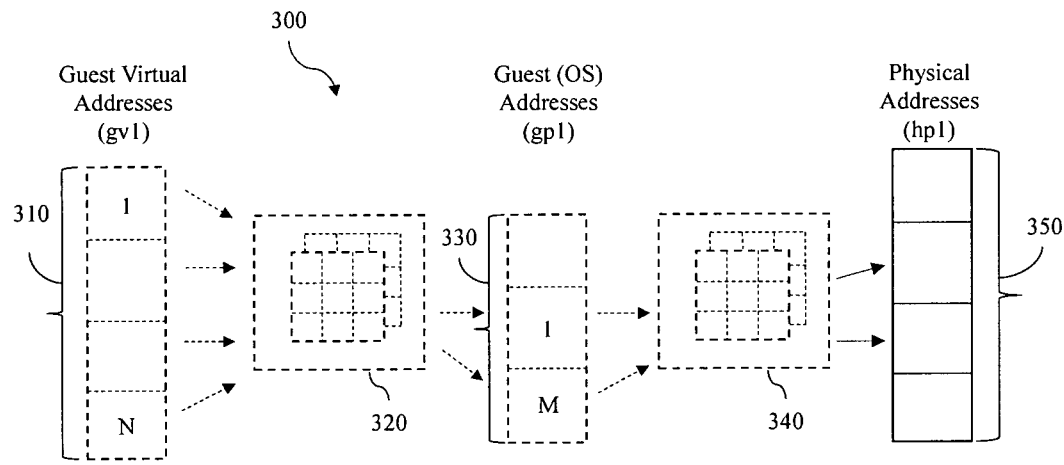
FIG. 3 is a block diagram of an example of multiple view instances of an extended page table according to an embodiment.

FIG. 3 depicts a block diagram of an example of virtual address mapping 300 according to an embodiment. The mapping 300 illustrates a progression of how virtual addresses are typically mapped to physical addresses with the assistance of Extended Page Tables (EPTs). The illustrated mapping 300 includes guest virtual addresses 310, operating system (OS) page tables 320, guest (OS) physical addresses 330, EPTs 340, and physical addresses 350. The guest virtual addresses 310 include addresses 1-N that may be mapped to one or multiple views of OS page table(s) 320. The OS page tables 320 may be loaded to guest (OS) physical addresses 330. The guest (OS) physical addresses 330 may be loaded to one or multiple views of EPTs 340. The EPTs 340 may be used to map the guest (OS) physical addresses 330 to physical addresses 350. The illustrated EPTs 340 allow system permissions to be set (i.e., specified) and may be controlled by a privileged component, such as, for example, the xMon 116 (FIG. 1). The mapping 300 may outline virtualization exceptions (#VEs) that provide a more optimal means for processing EPT violations. For example, instead of transitioning control to a virtual machine manager (VMM), the CPU may generate an exception on EPT violation, which may be fielded by a protected agent running inside the OS, thereby reducing transitional overhead of handling EPT violations. The illustrated mapping 300 also provides multiple views or instances of the EPT 340 and may be regarded as a permission map for the physical pages of guest OS. The xMon may create more than one view such as, for example, an instance of the EPT 340 for memory such as, for example, the memory 115 (FIG. 1), and may make any view active by simply setting the EPT pointer (EPTP) field in the virtual machine control structure (VMCS). The access permission maps, e.g., in the EPT 340, may be changed by "view switching" (i.e., switching the current EPT). A trusted agent such as, for example, the trusted application 132 (FIG. 1), in a guest OS may communicate with the xMon to create views with different permissions for different pages, and may request the xMon to switch views to control access to memory pages. The trusted agent may also use Fast View Switch (FVS) CPU assists to select and activate views without requiring a transition to VMXroot. INTEL VT-x for Directed IO may allow protection of memory from hardware devices using direct memory access (DMA).

As discussed above with respect to FIG. 1, the system 100 may modify the boot process by adjusting (i.e., modifying) the configuration compiler of the bootloader to start the xMon 116 before the OS 140, in order to enable the xMon 116 to take control of the hardware 112. As a result, the EPT 340 may only be controlled by the xMon 116 and any malicious entity operating in the OS 140 (or the OS itself) may not affect the enforcement of permissions. Once the OS 140 starts, the xMon 116 may typically be transparent and the OS 140 will be unaware of the xMon 116 running. Upon the OS 140 (or any entity therein) attempting to access certain hardware (e.g., accessing a control register to modify the operation of a processor), the system 100 may perform control transfers to transition control to the xMon 116. The xMon 116 may determine whether permission of the attempted action is allowed. The xMon 116 may determine, for example, whether the attempted modification makes sense (i.e., is logical) or whether it is allowed (i.e., has permission). Updates and changes to the policy may be made by a trusted application such as, for example, the trusted application 132, having appropriate administrative privilege. Because the policy is not pre-built, it may be dynamically configured at runtime. The process may also be automatic and does not require modifying an OS kernel such as, for example, a kernel in kernel database 124.

Figure 4:
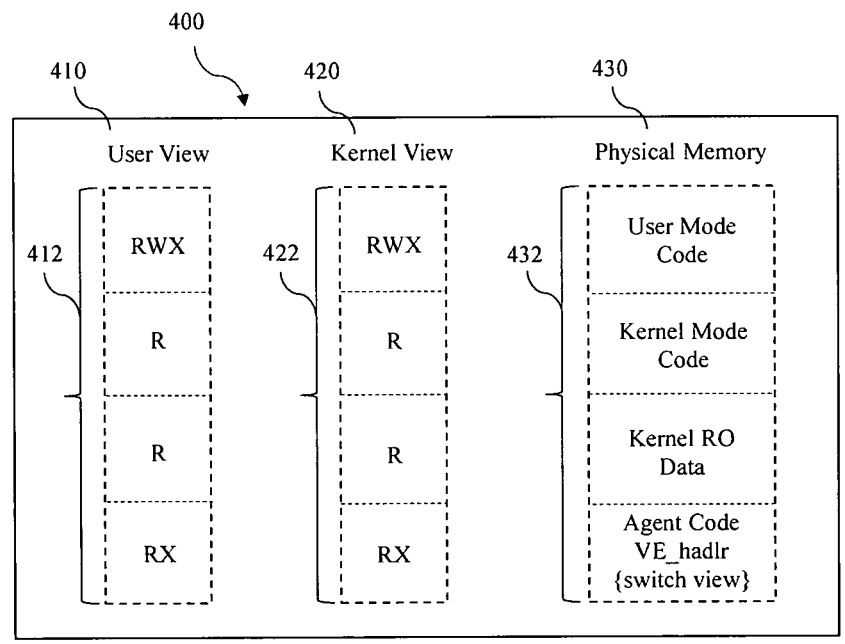
FIG. 4 is a block diagram of an example of an address mapping solution according to an embodiment.

FIG. 4 depicts a block diagram of an example of an address mapping solution 400 according to an embodiment. The illustrated mapping solution 400 has permissions for multiple views and includes a user view 410, a kernel view 420 and physical memory 430. The user view 410 may include permission codes (e.g., read, write, executable (RWX), read only (R), and read, executable (RX)) at various memory addresses 412. The kernel view 420 may also include permission codes (e.g., RWX, R, and RX) at various memory addresses 422. The physical memory 430 may set permission codes for the various memory addresses 432 of the multiple views including, for example, the user view 410 and the kernel view 420. The permission codes may include a user-mode code, a kernel code, a kernel read only (R) data code, and an agent (OS) code.

Figure 5:
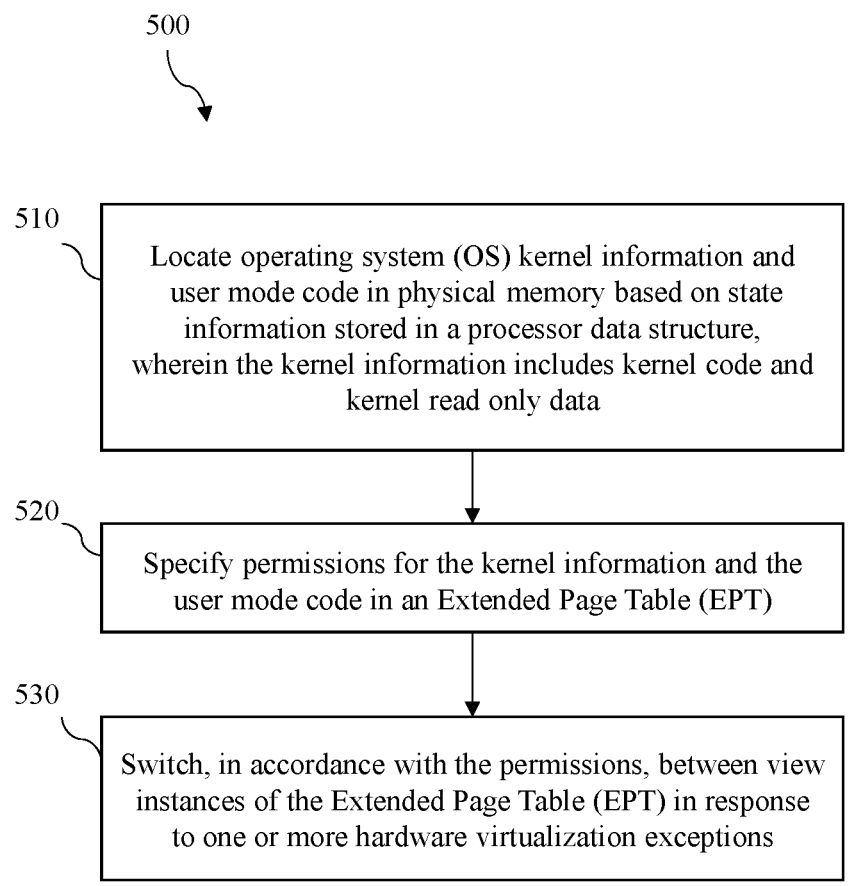
FIG. 5 is a flowchart of an example of a method of operating a computing system according to an embodiment.

FIG. 5 shows a method 500 of operating a computing system. The method 500 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof. The method 500 defines an example of a virtual machine extension root process for implementing kernel integrity enforcement without requiring modification to the OS according to an embodiment and may be implemented, for example, with the system 100 depicted in FIG. 1.

Illustrated processing block 510 provides for locating operating system (OS) kernel information and user mode code in physical memory based on state information stored in a processor data structure. The kernel information may include kernel code and kernel read only data. Illustrated processing block 520 provides for specifying permissions for the kernel information and the user mode code in an extended page table (EPT). Illustrated processing block 530 provides for switching, in accordance with the permissions, between view instances of the extended page tables (EPT) in response to one or more hardware virtualization exceptions. The illustrated method 500 may thereby utilize hardware assists to change view instances in order to specify permissions without requiring modification of the operating system (OS).

Figure 6:
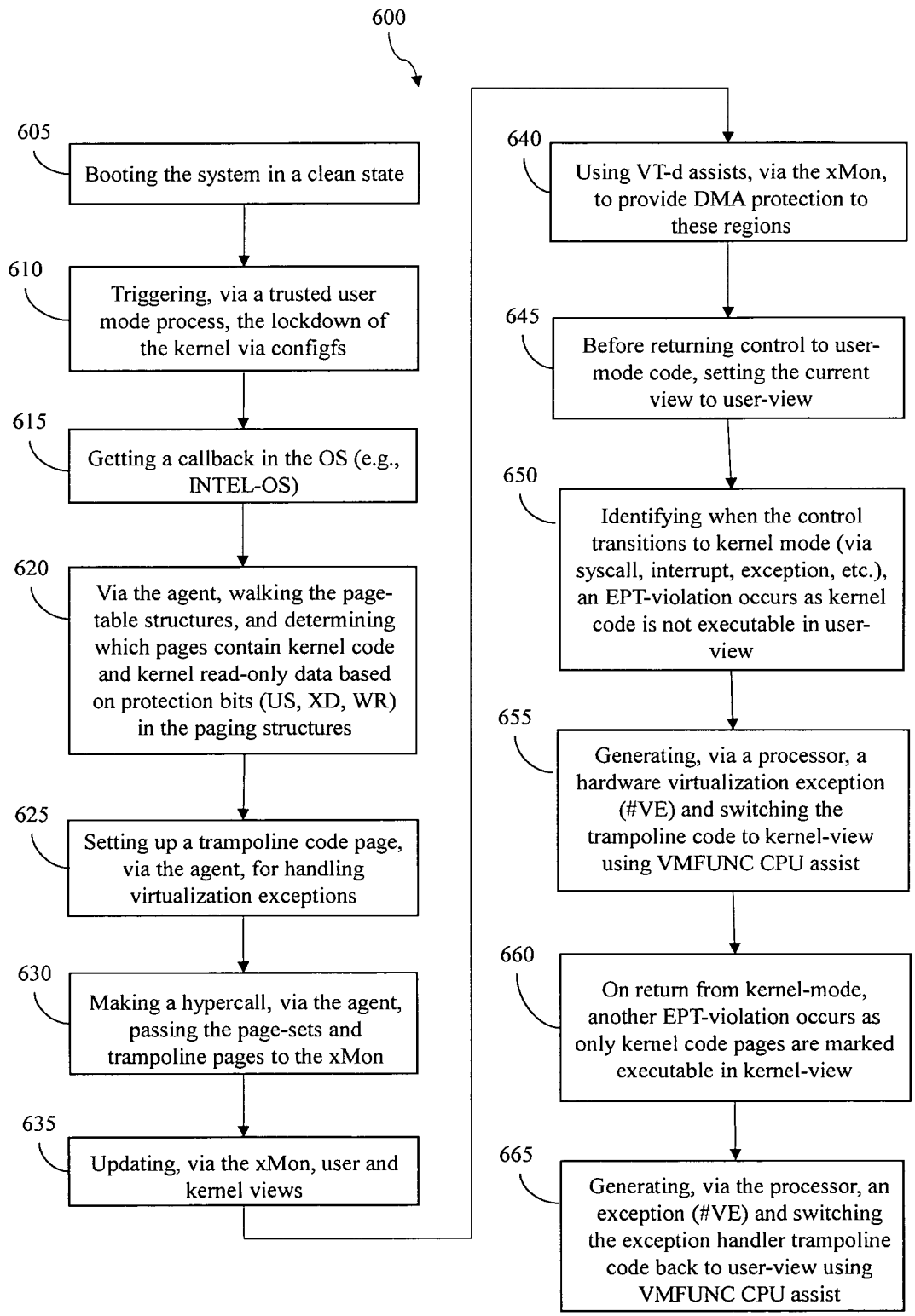
FIG. 6 is a flowchart of another example of a method of operating a computing system according to an embodiment.

FIG. 6 shows a method 600 of operating a computing system. The method 600 may be implemented in one or more modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMO) or TTL technology, or any combination thereof. The method illustrated 600 defines another example of a virtual machine extension root process for implementing kernel integrity enforcement without requiring modification to the OS according to an embodiment and may be implemented, for example, with the system 100 depicted in FIG. 1.

The illustrated method 600, which shows a detailed process according to an embodiment, is provided with various pre-conditions. For example, launch time integrity of the kernel and cleanliness of the system should be established at the time of setting up kernel protections. This may be established, for example, using either firmware based or TXT (INTEL Trusted Execution Technology) based measured launch schemes. The platform boot flow should also be modified to load and start the xMon before the OS. The xMon may protect its own memory using EPT and VT-d (INTEL Virtualization Technology for Directed I/O) assists. Two all-permissive views of the memory may be created before initializing the boot process. Further, an INTEL-OS agent may be used for handling virtualization exceptions in the manner described in the method 600.

Illustrated processing block 605 provides for booting the system in a clean state. Illustrated processing block 610 provides for triggering, via a trusted user mode process, the lockdown of the kernel via configfs. Configfs may be useful as it provides access control and allows driving from user mode. Illustrated processing block 615 provides for getting a callback in the OS (e.g., INTEL-OS). Illustrated processing block 620 provides for walking, via the agent, the page-table structures, and determining which pages contain kernel code and kernel read-only data based on protection bits (US, XD, WR) in the paging structures. Illustrated processing block 625 provides for setting up a trampoline code page, via the agent, for handling virtualization exceptions. Illustrated processing block 630 making a hypercall, via the agent, passing the page-sets and trampoline pages to the xMon. Illustrated processing block 635 provides for updating, via the xMon, user and kernel views. Only kernel code pages are executable in kernel-view, in the illustrated example. The kernel code pages may not be executable in user-view. Kernel and trampoline pages may be non-modifiable in both the views.

Illustrated processing block 640 provides for using VT-d assists, via the xMon, to provide DMA protection to these regions. Illustrated processing block 645 provides for before returning control to user-mode code, setting the current view to user-view. Illustrated processing block 650 provides for identifying when the control transitions to kernel mode (via syscall, interrupt, exception, etc.), an EPT-violation occurs as kernel code is not executable in user-view. Illustrated processing block 655 provides for generating, via a processor, a hardware virtualization exception (#VE) and switching the trampoline code to kernel-view using VMFUNC CPU assist. Illustrated processing block 660 provides for on return from kernel-mode, another EPT-violation occurs as only kernel code pages are marked executable in kernel-view. Illustrated processing block 665 provides for generating, via the processor, an exception (#VE) and switching the exception handler trampoline code back to user-view using VMFUNC CPU assist.

Thus, security OSVs/ISVs and solution providers, back-end/cloud and data center service providers, anti-malware solution companies, and so forth, may benefit from the techniques described herein. Moreover, these techniques may be used to enhance security and resiliency of various platforms, which may make non-Intel platforms a more attractive choice for data centers and devices. This disclosure may be particularly applicable to bare-metal container use-case where high density workloads are hosted on a shared kernel. This disclosure may also be productized and combined with other technologies such as TXT (INTEL Trusted Execution Technology) to create more trusted, secure, and resilient cloud hosting environments.

Figure 7:
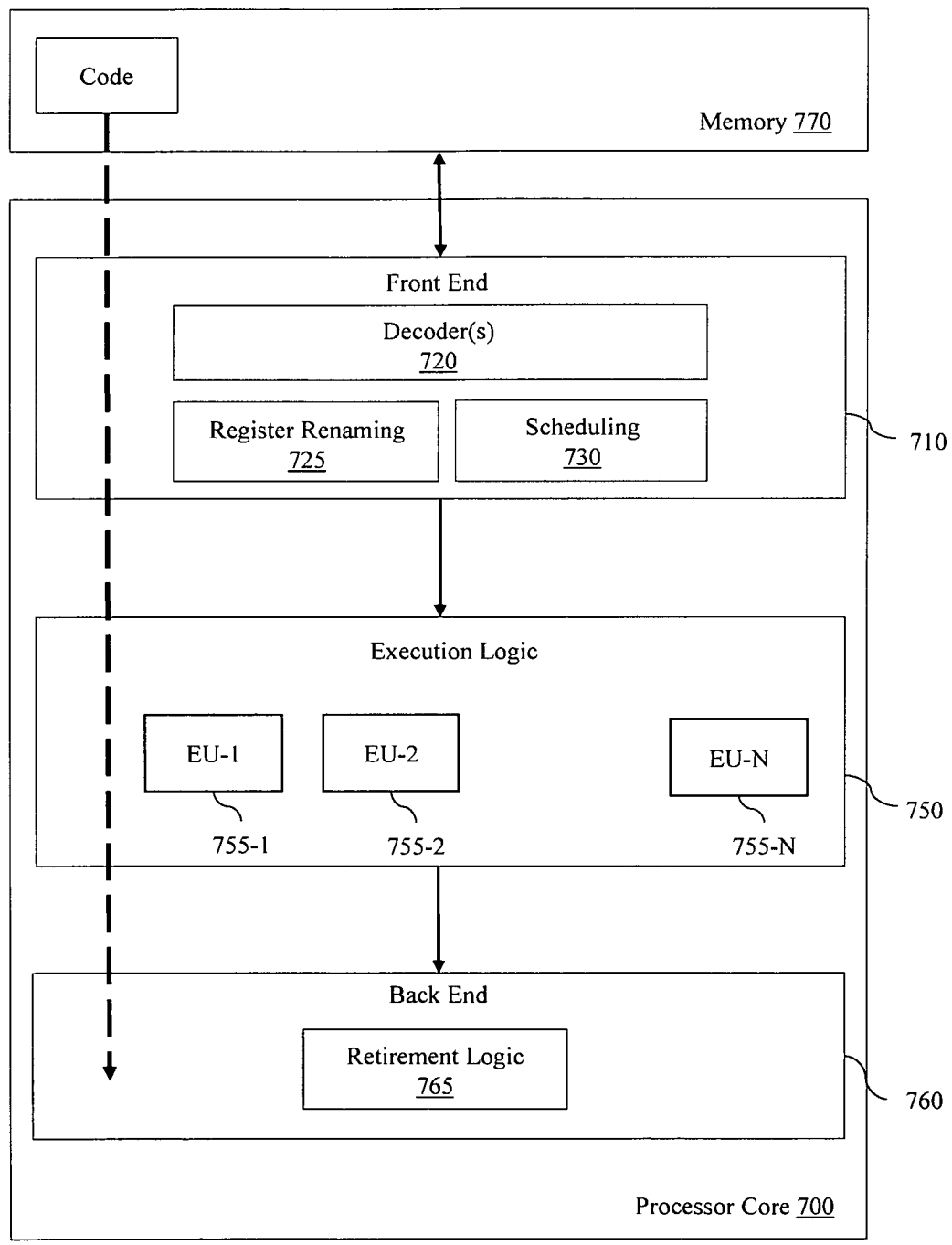
FIG. 7 is a block diagram of an example of a processor according to an embodiment.

FIG. 7 illustrates a processor core 700 according to one embodiment. The processor core 700 may be the core for any type of processor, such as a micro-processor, an embedded processor, a digital signal processor (DSP), a network processor, or other device to execute code. Although only one processor core 700 is illustrated in FIG. 7, a processing element may alternatively include more than one of the processor core 700 illustrated in FIG. 7. The processor core 700 may be a single-threaded core or, for at least one embodiment, the processor core 700 may be multithreaded in that it may include more than one hardware thread context (or "logical processor") per core.

FIG. 7 also illustrates a memory 770 coupled to the processor core 700. The memory 770 may be any of a wide variety of memories (including various layers of memory hierarchy) as are known or otherwise available to those of skill in the art. The memory 770 may include one or more code 713 instruction(s) to be executed by the processor core 700, wherein the code 713 may implement the method 500 (FIG. 5) and method 600 (FIG. 6), already discussed. The processor core 700 follows a program sequence of instructions indicated by the code 713. Each instruction may enter a front end portion 710 and be processed by one or more decoders 720. The decoder 720 may generate as its output a micro operation such as a fixed width micro operation in a predefined format, or may generate other instructions, microinstructions, or control signals which reflect the original code instruction. The illustrated front end portion 710 also includes register renaming logic 725 and scheduling logic 730, which generally allocate resources and queue the operation corresponding to the convert instruction for execution.

The processor core 700 is shown including execution logic 750 having a set of execution units 755-1 through 755-N. Some embodiments may include a number of execution units dedicated to specific functions or sets of functions. Other embodiments may include only one execution unit or one execution unit that can perform a particular function. The illustrated execution logic 750 performs the operations specified by code instructions.

After completion of execution of the operations specified by the code instructions, back end logic 760 retires the instructions of the code 713. In one embodiment, the processor core 700 allows out of order execution but requires in order retirement of instructions. Retirement logic 765 may take a variety of forms as known to those of skill in the art (e.g., re-order buffers or the like). In this manner, the processor core 700 is transformed during execution of the code 713, at least in terms of the output generated by the decoder, the hardware registers and tables utilized by the register renaming logic 725, and any registers (not shown) modified by the execution logic 750.

Although not illustrated in FIG. 7, a processing element may include other elements on chip with the processor core 700. For example, a processing element may include memory control logic along with the processor core 700. The processing element may include I/O control logic and/or may include I/O control logic integrated with memory control logic. The processing element may also include one or more caches.

Figure 8:
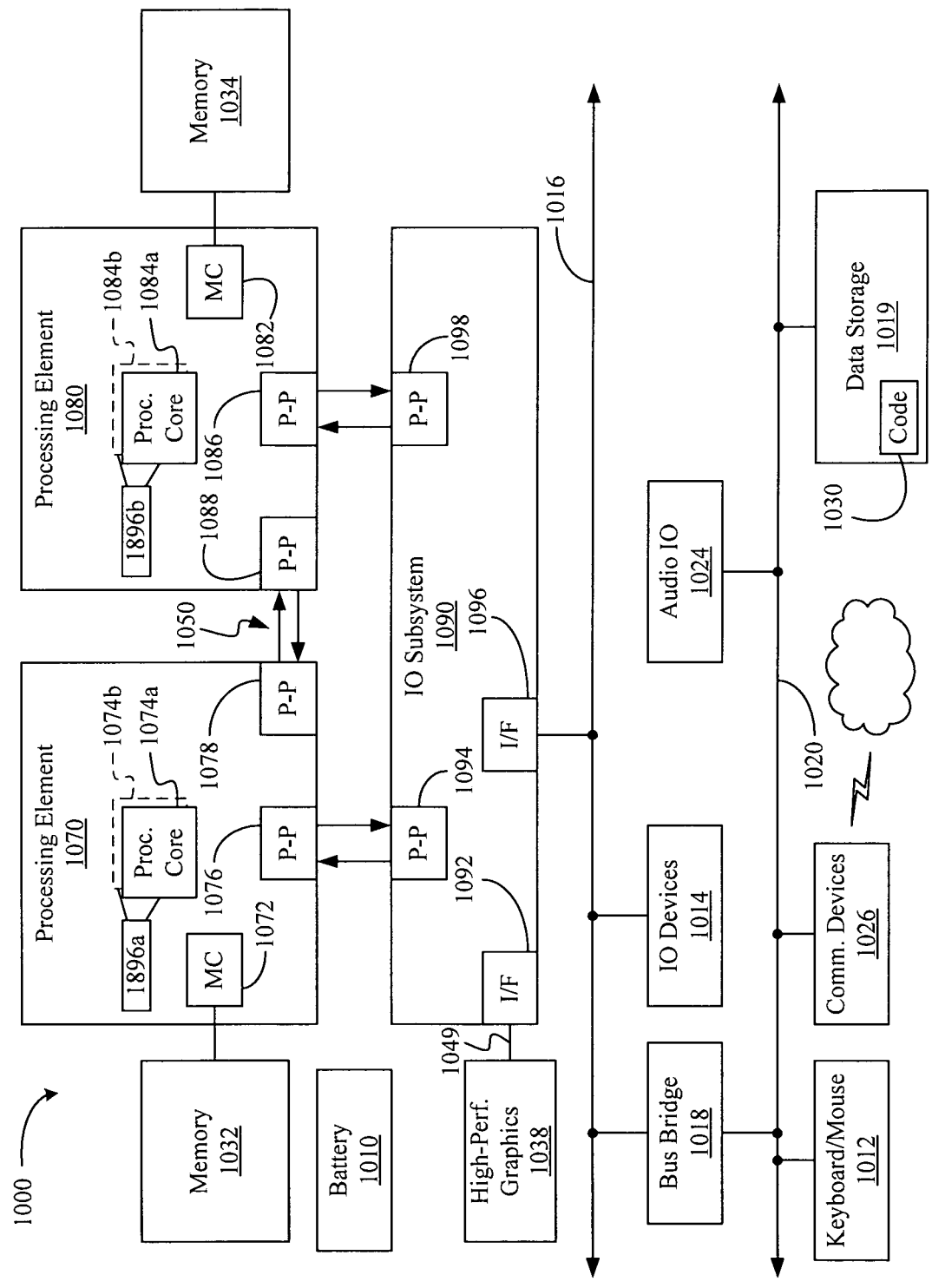
FIG. 8 is a block diagram of an example of a computing system according to an embodiment.

Referring now to FIG. 8, shown is a block diagram of a computing system 1000 embodiment in accordance with an embodiment. The system 1000 (i.e., a multiprocessor system) includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 500 (FIG. 5) and method 600 (FIG. 6), already discussed, and may be similar to the code 713 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Therefore, techniques described herein may enable non-extensibility and immutability of kernel code, page table mappings for kernel code, and kernel read-only data using hardware assisted outside-OS protections/enforcement. OS-agnostic solutions may also be achieved. Moreover processor assists may be used for performance optimization.

ADDITIONAL NOTES AND EXAMPLES

Example 1 may include a computing data security system including a system processor and a hypervisor including an extension monitor engine to locate operating system (OS) kernel information and user mode code in physical memory based on state information stored in a processor data structure, wherein the kernel information is to include kernel code, kernel page table mappings, and kernel read only data. The extension monitor engine may further specify permissions for the kernel information and the user mode code in an extended page table, and switch, in accordance with the permissions, between view instances of the extended page table in response to one or more hardware virtualization exceptions, wherein the extension monitor engine does not require modification to the operating system.

Example 2 may include the system of example 1, wherein the extension monitor engine de-privileges the operating system and causes the operating system to operate at a lower privilege.

Example 3 may include the system of any of examples 1 or 2, wherein a system policy may be dynamically configured at runtime.

Example 4 may include the system of example 1, wherein the boot process may be adjusted to start the extension monitor engine before the operating system to allow the extension monitor engine to take control of the system hardware.

Example 5 may include the system of example 1, wherein the extension monitor engine operates in a virtual machine extension root operation.

Example 6 may include the system of example 5, wherein the virtual machine extension root operation protects the operating system.

Example 7 may include the system of example 1, wherein the virtual machine extension monitor adjusts and sets the system policy.

Example 8 may include the system of example 1, wherein the permissions may be determined via multiple views that outline permission maps.

Example 9 may include at least one computer readable storage medium including a set of instructions, which when executed by a computing system, cause the computing system to locate operating system (OS) kernel information and user mode code in physical memory based on state information stored in a processor data structure, wherein the kernel information is to include kernel code, kernel page table mappings, and kernel read only data. The at least one computer readable storage medium, when executed, may further cause the computing system to specify permissions for the kernel information and the user mode code in an extended page table, and switch, in accordance with the permissions, between view instances of the extended page table in response to one or more hardware virtualization exceptions.

Example 10 may include the medium of example 9, wherein the instructions, when executed, cause the computing device to de-privilege the operating system, and cause the operating system to operate at a lower privilege.

Example 11 may include the medium of any of examples 9 or 10, wherein the instructions, when executed, cause the computing device to dynamically configure a system policy at runtime.

Example 12 may include the medium of example 9, wherein the instructions, when executed, cause the computing device to adjust the boot process to start the extension monitor engine before the operating system to allow the extension monitor engine to take control of the system hardware.

Example 13 may include the medium of example 9, wherein the instructions, when executed, cause the computing device to operate the extension monitor engine in a virtual machine extension root operation.

Example 14 may include the medium of example 13, wherein the virtual machine extension root operation protects the operating system.

Example 15 may include the medium of example 9, wherein the instructions, when executed, cause the computing device to adjust and set the system policy.

Example 16 may include the medium of example 9, wherein the instructions, when executed, cause the computing device to determine the permissions via multiple views that outline permission maps.

Example 17 may include a method for implementing kernel integrity enforcement including locating operating system (OS) kernel information and user mode code in physical memory based on state information stored in a processor data structure, wherein the kernel information is to include kernel code, kernel page table mappings, and kernel read only data. The method may further include specifying permissions for the kernel information and the user mode code in an extended page table, and switching, in accordance with the permissions, between view instances of the extended page table in response to one or more hardware virtualization exceptions.

Example 18 may include the method of example 17, further including de-privileging the operating system, and causing the operating system to operate at a lower privilege.

Example 19 may include the method of any of examples 17 or 18, further including dynamically configuring a system policy at runtime.

Example 20 may include the method of example 17, further including adjusting the boot process to start the extension monitor engine before the operating system to allow the extension monitor engine to take control of the system hardware.

Example 21 may include the method of example 17, further including operating the extension monitor engine in a virtual machine extension root operation.

Example 22 may include the method of example 17, wherein the virtual machine extension root operation protects the operating system.

Example 23 may include the method of example 17, further including adjusting and setting the system policy.

Example 24 may include the method of example 17, further including determining the permissions via multiple views that outline permission maps.

Example 25 may include an apparatus for providing computing data security including a hypervisor having an extension monitor engine to locate operating system (OS) kernel information and user mode code in physical memory based on state information stored in a processor data structure, wherein the kernel information is to include kernel code, kernel page table mappings, and kernel read only data. The apparatus may further include specify permissions for the kernel information and the user mode code in an extended page table, and switch, in accordance with the permissions, between view instances of the extended page table in response to one or more hardware virtualization exceptions, wherein the extension monitor engine does not require modification to the operating system.

Example 26 may include the apparatus of example 25, wherein the extension monitor engine de-privileges the operating system and causes the operating system to operate at a lower privilege.

Example 27 may include the apparatus of any of examples 25 or 26, wherein a system policy may be dynamically configured at runtime.

Example 28 may include the apparatus of example 25, wherein the boot process may be adjusted to start the extension monitor engine before the operating system to allow the extension monitor engine to take control of the system hardware.

Example 29 may include the apparatus of example 25, wherein the extension monitor engine operates in a virtual machine extension root operation.

Example 30 may include the apparatus of example 29, wherein the virtual machine extension root operation protects the operating system.

Example 31 may include the apparatus of example 25, wherein the virtual machine extension monitor adjusts and sets the system policy.

Example 32 may include the apparatus of example 25, wherein the permissions may be determined via multiple views that outline permission maps.

Example 33 may include an apparatus for providing computing data security including means for locating operating system (OS) kernel information and user mode code in physical memory based on state information stored in a processor data structure, wherein the kernel information is to include kernel code, kernel page table mappings, and kernel read only data. The apparatus may further include means for specifying permissions for the kernel information and the user mode code in an extended page table, and switch, in accordance with the permissions, between view instances of the extended page table in response to one or more hardware virtualization exceptions, wherein the apparatus does not require modification to the operating system.

Example 34 may include the apparatus of example 33, further including means for de-privileging the operating system, and means for causing the operating system to operate at a lower privilege.

Example 35 may include the apparatus of any of examples 33 or 34, further including means for dynamically configuring a system policy at runtime.

Example 36 may include the apparatus of example 33, further including means for adjusting the boot process to start the extension monitor engine before the operating system to allow the extension monitor engine to take control of the system hardware.

Example 37 may include the apparatus of example 33, further including means for operating the extension monitor engine in a virtual machine extension root operation.

Example 38 may include the apparatus of example 37, wherein the virtual machine extension root operation is to protect the operating system.

Example 39 may include the apparatus of example 33, further including means for adjusting and setting the system policy.

Example 40 may include the apparatus of example 33, further including means for determining the permissions via multiple views that outline permission maps.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a system processor; and
a hypervisor, implemented at least partly in one or more of configurable logic or fixed functionality logic hardware, including an extension monitor engine to:
locate operating system (OS) kernel information and user mode code in physical memory based on state information stored in a processor data structure, wherein the kernel information is to include kernel code, kernel page table mappings, and kernel read only data;
specify permissions for the kernel information and the user mode code in an extended page table; and
switch, in accordance with the permissions, between view instances of the extended page table in response to one or more hardware virtualization exceptions,
wherein the extension monitor engine operates in a special privilege mode that is more restrictive than a kernel mode and does not require modification to the operating system.

2. The system of claim 1, wherein the extension monitor engine de-privileges the operating system and causes the operating system to operate in a less restrictive privilege mode than the special privilege mode.

3. The system of claim 1, wherein a system policy may be dynamically configured at runtime.

4. The system of claim 1, wherein the boot process may be adjusted to start the extension monitor engine before the operating system to allow the extension monitor engine to take control of the system hardware.

5. The system of claim 1, wherein the extension monitor engine operates in a virtual machine extension root operation.

6. The system of claim 5, wherein the virtual machine extension root operation protects the operating system.

7. The system of claim 1, wherein a virtual machine extension monitor adjusts and sets a system policy.

8. The system of claim 1, wherein the permissions may be determined via multiple views that outline permission maps.

9. At least one non-transitory computer readable storage medium comprising a set of instructions, which when executed by a computing device, cause the computing device to:
locate operating system (OS) kernel information and user mode code in physical memory based on state information stored in a processor data structure, wherein the kernel information is to include kernel code, kernel page table mappings, and kernel read only data;
specify permissions for the kernel information and the user mode code in an extended page table; and
switch, in accordance with the permissions, between view instances of the extended page table in response to one or more hardware virtualization exceptions, wherein at least one component operates in a special privilege mode that is more restrictive than a kernel mode and does not require modification to the operating system.

10. The at least one non-transitory computer readable storage medium of claim 9, wherein the instructions, when executed, cause the computing device to:
de-privilege the operating system; and
cause the operating system to operate in a less restrictive privilege mode than the special privilege mode.

11. The at least one non-transitory computer readable storage medium of claim 9, wherein the instructions, when executed, cause the computing device to dynamically configure a system policy at runtime.

12. The at least one non-transitory computer readable storage medium of claim 9, wherein the instructions, when executed, cause the computing device to adjust the boot process to start an extension monitor engine before the operating system to allow the extension monitor engine to take control of the system hardware.

13. The at least one non-transitory computer readable storage medium of claim 9, wherein the instructions, when executed, cause the computing device to operate an extension monitor engine in a virtual machine extension root operation.

14. The at least one non-transitory computer readable storage medium of claim 13, wherein the virtual machine extension root operation protects the operating system.

15. The at least one non-transitory computer readable storage medium of claim 9, wherein the instructions, when executed, cause the computing device to adjust and set a system policy.

16. The at least one non-transitory computer readable storage medium of claim 9, wherein the instructions, when executed, cause the computing device to determine the permissions via multiple views that outline permission maps.

17. A method comprising:
locating operating system (OS) kernel information and user mode code in physical memory based on state information stored in a processor data structure, wherein the kernel information is to include kernel code, kernel page table mappings, and kernel read only data;
specifying permissions for the kernel information and the user mode code in an extended page table; and
switching, in accordance with the permissions, between view instances of the extended page table in response to one or more hardware virtualization exceptions, wherein at least one component operates in a special privilege mode that is more restrictive than a kernel mode and does not require modification to the operating system.

18. The method of claim 17, further including:
de-privileging the operating system; and
causing the operating system to operate in a less restrictive privilege mode than the special privilege mode.

19. The method of claim 17, further including dynamically configuring a system policy at runtime.

20. The method of claim 17, further including adjusting the boot process to start an extension monitor engine before the operating system to allow the extension monitor engine to take control of the system hardware.

21. The method of claim 17, further including operating an extension monitor engine in a virtual machine extension root operation.

22. The method of claim 21, wherein the virtual machine extension root operation protects the operating system.

23. The method of claim 17, further including adjusting and setting a system policy.

24. An apparatus comprising:
a hypervisor, implemented at least partly in one or more of configurable logic or fixed functionality logic hardware, including an extension monitor engine to:
locate operating system (OS) kernel information and user mode code in physical memory based on state information stored in a processor data structure, wherein the kernel information is to include kernel code, kernel page table mappings, and kernel read only data;
specify permissions for the kernel information and the user mode code in an extended page table; and
switch, in accordance with the permissions, between view instances of the extended page table in response to one or more hardware virtualization exceptions,
wherein the extension monitor engine operates in a special privilege mode that is more restrictive than a kernel mode and does not require modification to the operating system.

25. The apparatus of claim 24, wherein the extension monitor engine de-privileges the operating system and causes the operating system to operate in a less restrictive privilege mode than the special privilege mode.

* * * * *